United States Patent [19]

Thomson

[11] Patent Number: 4,493,864

[45] Date of Patent: Jan. 15, 1985

[54] COATED PIPE AND METHOD OF MAKING SAME

[75] Inventor: Ian D. M. Thomson, Plumsteadville, Pa.

[73] Assignee: Arbonite Corporation, Doylestown, Pa.

[21] Appl. No.: 394,092

[22] Filed: Jul. 1, 1982

[51] Int. Cl.³ .............. B32B 7/02; B32B 15/00; D03D 49/06

[52] U.S. Cl. .............. 428/36; 428/367; 428/375; 428/379; 428/217; 138/109

[58] Field of Search .............. 428/212, 217, 36, 364, 428/375, 379, 367; 138/109, DIG. 6, 145, 146

[56] References Cited

U.S. PATENT DOCUMENTS

| 4,188,765 | 2/1980 | Jackson | 428/217 |
| 4,383,555 | 5/1983 | Finley | 138/122 |

Primary Examiner—Marion E. McCamish
Assistant Examiner—Beverly K. Johnson

Attorney, Agent, or Firm—Ratner & Prestia

[57] ABSTRACT

Protectively coated flanged pipe comprising a pipe with a relatively low durometer surface coating in the pipe section and a relatively higher durometer coating, free of the tendency to creep or cold flow over a period of time, on the flange section surfaces. Preferably, this product is made by a process, wherein the pipe is first surface roughened throughout and then selectively primed in the pipe section only, leaving the flange section surface non-receptive to a subsequent primer, which upon setting of the primer, readies the pipe for dip coating in the lower durometer resin protective coating. The dip coating, upon fusion, is then easily stripped from the flange section surface, due to the non-retention there in the unprimed areas, and the flange section surface is subsequently coated, preferably by spraying, with a higher durometer coating which effects protection of the flange joint without the tendency to creep over a period of time.

2 Claims, 1 Drawing Figure

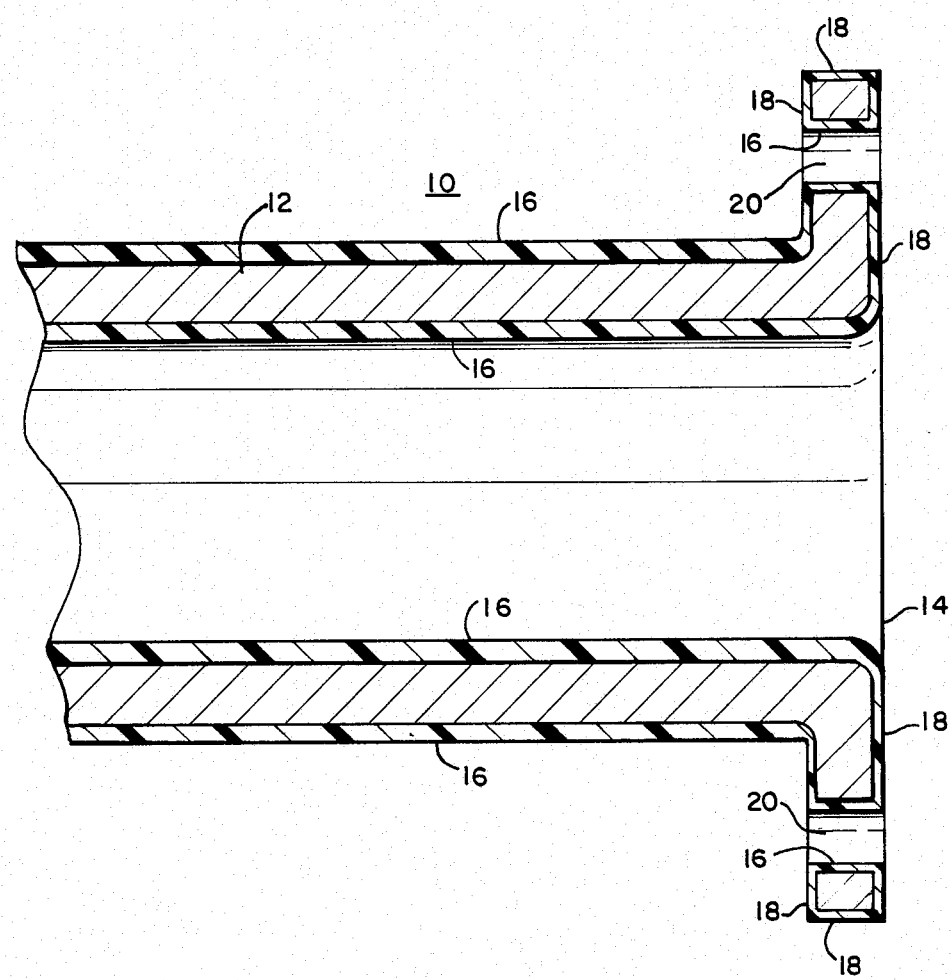

COATED PIPE AND METHOD OF MAKING SAME

BACKGROUND OF THE INVENTION

This invention pertains to an improvement in protectively coated flanged pipe. This invention pertains also to a method for making such pipe.

Metal pipe intended for corrosive or erosive applications is often provided with a plastic or resin coating for protection of the base metal. Typically, the base metal is stainless steel or a conventional carbon steel, and the coating is a resin, such as polyvinyl chloride (hereafter PVC). While a variety of methods may be used for coating the pipe, dip coating is preferred for simplicity and to ensure complete coating of all of the exposed surfaces of the pipe, both inside and out.

When the typical resin coating, deposited in this manner, is squeezed between the bolt heads, washers, and nuts of a flanged pipe joint, the resin, particularly dip coated PVC which is relatively soft, tends to "creep" or "cold flow" over a period of time. Thus, the integrity of the seal deteriorates as a result of loosening of the fastening hardware, unless the fastening hardware is tightened periodically. In many applications, this is intolerable.

Heretofore, this problem has been rectified by the provision of thin stainless steel plates disposed on the facing outer surfaces and abutting flange joints. Thus the pressure on the flanges is evenly distributed on the underlying PVC coating, and the tendency of the coating to creep is minimized. This solution to the problem, however, is quite expensive.

Ideally, of course, the plastic coating on the flange surfaces should be sufficiently hard and free of the tendency to creep, while protecting the underlying pipe. To provide such a coating on the entire pipe surface, including that part of the pipe surface other than a flange, however, has been considered impractical or overly expensive.

For purposes of considering the patentability of the invention disclosed and claimed herein, a brief patentability search was conducted. The U.S. Pat. Nos. identified to be of possible interest in that search were: 3,248,253 Barford et al, 3,392,700 H. E. Mallory, 3,425,455 Kilpert et al, 3,502,492 L. L. Spiller, 3,541,670 E. D. McCrory, 3,687,704 R. C. Stanley, 3,946,125 W. Scheiber, 3,965,854 W. Scheiber, 4,075,376 F. Jaeger, 4,122,798 J. E. Gibson, 4,273,798 W. Scheiber It should be noted that the Scheiber '125 patent is directed to an apparatus and method for coating hollow bodies, and it does show a coating applied to pipe bodies in stages where the first stage coats the central body and the second stage coats the end sections.

The Stanley patent also shows a method for coating pipes using a two stage type coating, in the first stage of which an initial layer of coating material is applied longitudinally to the pipe. At the second coating station, a second layer of coating is applied.

The Scheiber '798 patent also shows coating of a pipe in a plurality of stages but does not show the seperate coating of the pipe flange.

A pipe coating method wherein spraying and immersion coating is combined is taught in the Mallory patent. However, this is not accomplished sequentially or with reference to selectively coated pipe surfaces, as in the present invention.

In general then these references are not deemed to suggest or render obvious, much less anticipate, the present invention.

Having in mind all of this prior art and the problems referred to above, the general object of the present invention is to provide a protectively coated flanged pipe coated substantially in a relatively conventional and practical way but including a coating of improved characteristics with respect to the maintenance of joint integrity. It is also a part of the general object of the present invention to provide a method for making such an improved pipe.

BRIEF DESCRIPTION OF THE INVENTION

This object is met, in brief, by a protectively coated flanged pipe, the pipe section of which is coated with a first relatively lower durometer protective resin (preferably PVC) coating, and the flange section of which is coated with a second relatively higher durometer protective resin (also preferably PVC) coating. The pipe itself may be composed of any metal, but would ordinarily be carbon or stainless steel. Preferably also the coating on the pipe section is a dip coated PVC plastisol with a 70-80 Shore A hardness and the flange coating is a spray coated higher durometer, preferably about 86-94 Shore A hardness, PVC coating.

Preferably also, the protectively coated pipe of the present invention is made by the method of the present invention which comprises:

(a) roughening the entire surface of the flanged metal pipe to be protectively coated (such as by grit blasting);

(b) selectively applying a resin-receptive primer only to the pipe section portion of the entire pipe (such as by spraying or applying the primer while sealing or masking the flange section of the pipe) and heating the primed surface to "bake in" the primers;

(c) dip coating the entire pipe, preferably by immersion in a PVC plastisol, to provide a high integrity protective coating of the entire pipe (the dip coated PVC is a relatively low durometer resin formulation which is selectively well adhered only to that portion of the surface rendered receptive thereto by the prior primer application);

(d) stripping the dip coating from the flange section, to which it is not well adhered because of the absence of the primer in that section of the pipe;

(e) applying resin-receptive primer to the flange section of the pipe;

(f) spray coating onto the flange section a thin and highly uniform coating of a higher durometer resin (preferably PVC) formulation preferably by a spray method known conventionally as "airless spraying"; and (g) curing the entire pipe coating.

For a better understanding of the present invention, reference may be made to the detailed description thereof which follows, taken in conjunction with the appended claims and the accompanying FIGURE, which is a cross-sectional view of a protectively coated in accordance with the preferred embodiment of the present invention.

DETAILED DESCRIPTION OF THE INVENTION

Referring more specifically to the FIGURE, there is shown, in cross-sectional view, a segment of a flanged pipe 10 including a pipe section 12, and a flange section 14, with bolt holes 20 therein. Both the inner and outer surfaces of pipe section 12 are coated with a relatively low durometer (on the order of 70-80 Shore A hardness although a durometer as low as 45 may be used) PVC coating 16 while the flange section 14 of pipe 10 is covered with a thin, uniform, and relatively higher durometer (on the order of 86-94 Shore A hardness) PVC coating 18. Other resins than PVC may also be used, but PVC is preferred.

Generally pipe 10 may consist of substantially any metal but low carbon steel and stainless steel would ordinarily be used. The length of the pipe may typically be from 2 feet to 12 feet and above with a diameter ranging from 8 to 36 inches. Generally also, pipe coating 16 is on the order of 1/16 to ¼ inch thick and the thickness of the flange coating 18 is on the order of 1/64-⅛ inch.

The differential characteristics of the two types of PVC coating, in this preferred form of the invention, are such that the pipe may be produced in a practical and relatively conventional manner. Yet, a high integrity protective coating is provided and a flange joint, substantially free of any long term tendency to creep or cold flow over an extended period of time, is facilitated.

While a pipe in accordance with the present invention may be made by various processes, the presently preferred process, which forms part of the present invention, is described below.

The preferred process for making the product of the present invention is also considered part of this invention. In accordance with this process, a carbon steel or stainless steel pipe with an end flange is first surface roughened, such as by steel angular grit blasting, to roughen all surfaces of the pipe and thus to render it more receptive to the subsequently applied coating materials. The flange section surface is then sealed or masked (so as to prevent application of primer to the flange in the subsequent primer application) and the surfaces of the remaining pipe section of the pipe are primed, for the subsequent resin dip coating, by application of a resin-receptive primer which is thereafter baked to melt and to fuse the primer into the roughened surface of the pipe. The entire pipe is then reheated to 450°-475° F. and dip coated by immersion in a low durometer resinous bath, preferably a PVC plastisol (a viscous, plasticized PVC liquid) dip coating composition.

Upon removal of the dip coated pipe from the bath, it is permitted to gel to provide a fully coated pipe product. The dip coating is then stripped from the flange surface of the pipe except for the interior of bolt holes 20. This stripping operation is facilitated by the fact that the dip coating does not adhere well in the non-primed flange surface segment. The flange section surface is then primed, as the pipe section surface had previously been primed, and coated by spraying a higher durometer resin coating, such as a higher durometer PVC spray coating formulation. The spray application of the higher durometer resin coating is preferably effected by the conventional spray coating technique known as airless spraying for optimum uniformity and surface conformation with minimum thickness. In the final stage of the process of this invention, the entire pipe with the dissimilar resinous coatings is cured, such as by heating the coated pipe to a temperature sufficient to cure both resin coatings.

The resultant product is a fully protected pipe with a protective coating in the flange area better adapted to effect the flange joint seal, without the tendency of loosening the fastening hardware over a period of time due to resin creep or cold flow.

By way of example, a conventional flange-end schedule 40 carbon steel pipe with an inside diameter of 4 in. and a typical length of from 10 to 20 ft. is coated in accordance with the present invention by first surface blasting all surfaces of the pipe to a near white finish with a surface profile on the order of 1½ to 3 mils, with a GA/40 angular steel grit, in accordance with blast specification SSPC-SP10-63T. The flange end of the pipe is then masked and the pipe spray coated with a resin-receptive primer, such as that commercially available from the Arbonite Corporation of Doylestown, Pa., under the commercial designation Arbosol Primer W1452. The pipe is then heated to a temperature on the order of 315°-410° F. for ½ to 1½ hours, in order to fuse the primer. Subsequently, the pipe is reheated in an oven at 340°-410° F. for from 15 minutes to an hour, to prepare it for dip coating. The heated pipe is then dip coated in a PVC plastisol, such as that commercially available from the Arbonite Corporation of Doylestown, Pa. under the commercial designation Arbosol T700605. The residence time of the pipe in the dip coating bath may be varied depending on the thickness of coating used; the desired range of coating thickness being on the order of 1/16-¼ inch.

The dip coating product is then placed in an oven held to a temperature in the range of 290°-360° F. for a time in the range from 15 minutes to 1½ hours, to permit the dip coating to become firm, though not fully cured.

The masking is then removed from the flange along with the dip coating covering the masking and the flange area primed in the same manner as the main area of the pipe had previously been primed. The flange area is then spray coated with a PVC plastisol, such as that commercially available from the Arbonite Corporation of Doylestown, Pa., under the commercial designation Arbosol T-SP900305. Spraying is continued to produce a spray coating thickness on the order of 10-60 mils, and the coated product is then placed in an oven held in the range of 290°-360° F. for a time period of from 30 minutes to 1½ hours. The oven temperature is then increased to a temperature in the range of from 340°-410° F. for a further period of 10-30 minutes.

Within the ranges of times and temperatures given in this example, those skilled in the art will recognize various parameters to be taken into account in arriving at specific times and temperatures in any given process. Generally, the greater the mass of metal in the pipe, and the smaller the oven in comparison thereto, the longer the residence time that will be required to an oven to bring the pipe or pipe coating up to a specified temperature. Similarly, higher oven temperatures will likely reduce the time required in the oven at each stage of the process.

While this invention has been described with reference to specific embodiments thereof, it is not limited thereto and the appended claims are intended to be construed to encompass not only those forms and embodiments of the invention disclosed but to such other forms and embodiments of the invention as may be devised by those skilled in the art without departing from the true spirit and scope thereof.

I claim:

1. A protectively coated flanged pipe comprising a pipe section and at least one flange section, wherein the surface of said pipe section is coated with a first relatively lower durometer protective resin coating and, the surface of said flange section is coated with a second relatively higher durometer protective resin coating said pipe is composed of carbon or stainless steel and said protective coatings are PVC wherein the durometer of said first coating is about 45–80 shore A and the durometer of said second coating is about 86–94 shore A.

2. A pipe, as recited in claim 1, wherein said protective coatings are PVC, the durometer of said first coating being about 70–80 Shore A and the durometer of said second coating being about 86–94 Shore A.

* * * * *